United States Patent
Mammen et al.

(10) Patent No.: US 9,794,146 B2
(45) Date of Patent: Oct. 17, 2017

(54) METHODS AND SYSTEMS FOR A MONITORING DEVICE TO EXECUTE COMMANDS ON AN ATTACHED SWITCH

(71) Applicant: CISCO TECHNOLOGY, INC., San Jose, CA (US)

(72) Inventors: Biju Mathews Mammen, Santa Clara, CA (US); Samar Sharma, San Jose, CA (US); Nikhil Dhar, San Jose, CA (US); Avni Baveja, San Jose, CA (US); Mitali Parthasarathy, Sunnyvale, CA (US); Ashish Purushottam Attarde, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 226 days.

(21) Appl. No.: 14/705,368

(22) Filed: May 6, 2015

(65) Prior Publication Data
US 2016/0212026 A1    Jul. 21, 2016

Related U.S. Application Data

(60) Provisional application No. 62/106,057, filed on Jan. 21, 2015, provisional application No. 62/106,064, filed on Jan. 21, 2015.

(51) Int. Cl.
*G06F 15/16* (2006.01)
*H04L 12/26* (2006.01)
*H04L 12/24* (2006.01)

(52) U.S. Cl.
CPC .............. *H04L 43/08* (2013.01); *H04L 41/04* (2013.01); *H04L 41/0806* (2013.01); *H04L 43/12* (2013.01)

(58) Field of Classification Search
CPC ......... H04L 43/08; H04L 43/12; H04L 41/04; H04L 41/0806
See application file for complete search history.

(56) References Cited

U.S. PATENT DOCUMENTS

| 2003/0135575 | A1* | 7/2003 | Marejka | H04L 43/00 709/207 |
|---|---|---|---|---|
| 2004/0103153 | A1 | 5/2004 | Chang et al. | |
| 2004/0158630 | A1 | 8/2004 | Chang et al. | |
| 2008/0040191 | A1* | 2/2008 | Chakravarty | G06Q 10/06 705/7.15 |
| 2011/0122221 | A1* | 5/2011 | Su | H04L 12/12 348/14.04 |
| 2014/0089492 | A1* | 3/2014 | Nelson | H04L 67/325 709/224 |
| 2014/0137109 | A1 | 5/2014 | Sharma et al. | |

* cited by examiner

Primary Examiner — Viet Vu

(57) ABSTRACT

In one embodiment, a method for enabling network appliance monitoring is disclosed. The method includes establishing a remote execution channel for executing commands on a network element such as e.g. a switch. The method also includes using the remote execution channel to initiate execution of one or more commands on the network element. The method further includes receiving at least part of an output resulting from the execution of the one or more commands, wherein the received at least part of the output enables performing the network appliance monitoring.

20 Claims, 7 Drawing Sheets

METHODS AND SYSTEMS FOR A MONITORING DEVICE TO EXECUTE COMMANDS ON AN ATTACHED SWITCH

CROSS-REFERENCE TO RELATED APPLICATIONS

This application claims the benefit of priority under 35 U.S.C. §119(e) to U.S. Provisional Application Ser. No. 62/106,057, entitled "METHODS AND SYSTEMS FOR A MONITORING DEVICE TO EXECUTE COMMANDS ON AN ATTACHED SWITCH" filed Jan. 21, 2015, and U.S. Provisional Application Ser. No. 62/106,064, entitled "METHODS AND SYSTEMS FOR A NETWORK APPLIANCE MODULE ENABLING DYNAMIC VDC AWARE SPAN," filed Jan. 21, 2015, which are hereby incorporated by reference in their entirety.

TECHNICAL FIELD

This disclosure relates in general to the field of communications and, more particularly, to a method and an apparatus for enabling network appliance monitoring.

BACKGROUND

Data centers are increasingly used by enterprises for effective collaboration, data storage, and resource management. A typical data center network contains myriad network elements including servers, load balancers, routers, switches, etc. The network connecting the network elements provides secure user access to data center services and an infrastructure for deployment, interconnection, and aggregation of shared resources. Improving operational efficiency and optimizing utilization of resources in data centers are some of the challenges facing data center managers. Data center managers seek a resilient infrastructure that consistently supports diverse applications and services. A properly planned data center network provides application and data integrity and, further, optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

OVERVIEW

Figure 1A:
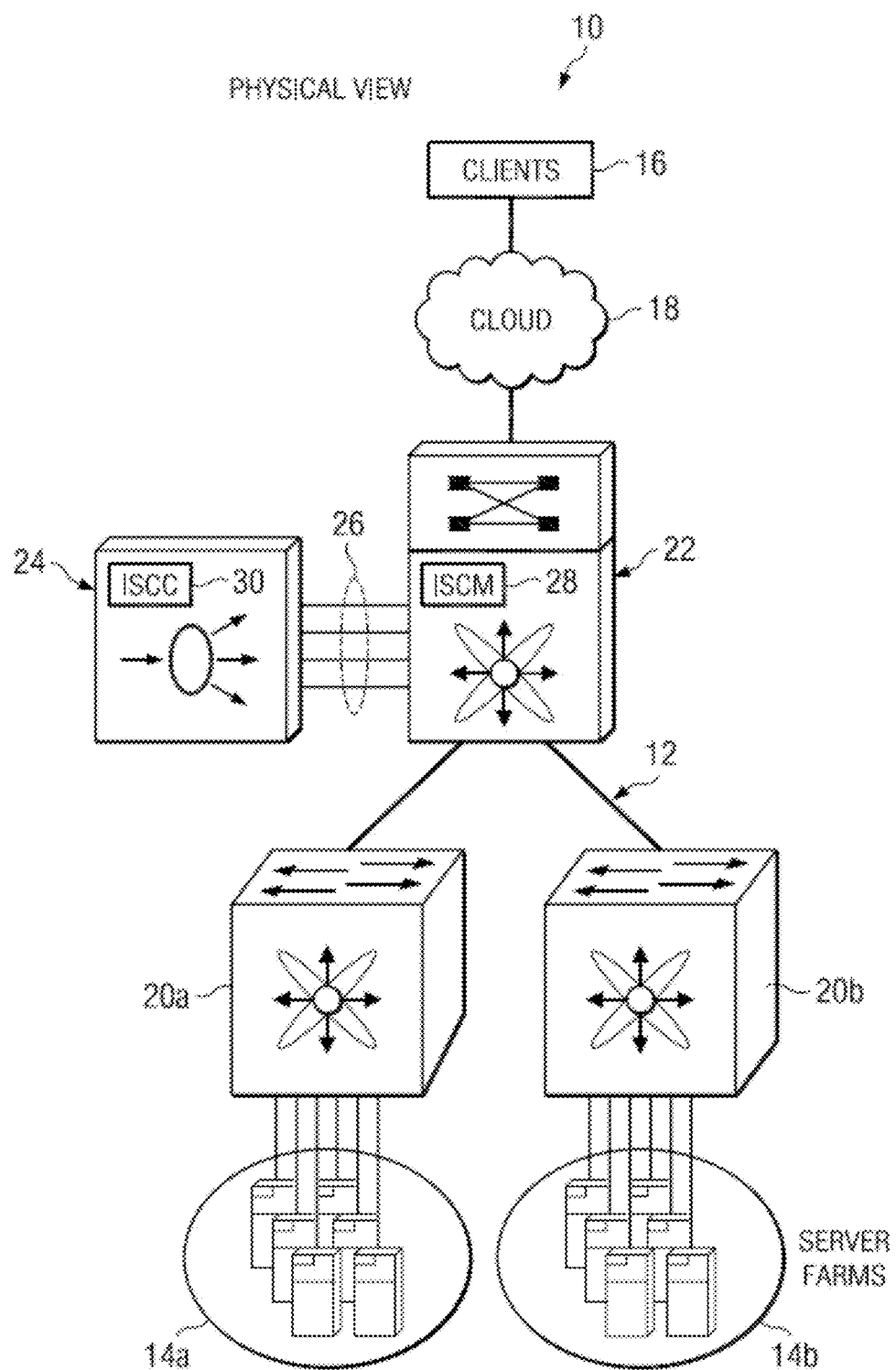
FIG. 1A is a simplified schematic diagram illustrating a physical view of a system for providing service appliances in a network environment in accordance with some embodiments of the present disclosure.

In one aspect of the present disclosure, a method for enabling network appliance monitoring is disclosed. In particular, a method for a monitoring device such as a network appliance monitoring (NAM) module to execute one or more commands on a network element (e.g. a switch) to which the NAM module is connected to is disclosed. The method includes providing the command from the NAM module to the network element over a first communication channel between the NAM module and the network element, the command triggering the network element to determine whether execution of the command on the network element is allowed and, upon positive determination, execute the command on the network element. The method also includes receiving, at the NAM module, from the network element, at least part of an output resulting from the execution of the command.

Another aspect of the present disclosure takes place in a setting where a NAM module includes a NAM data port physically connected, over a data communication link, to a data port of a network element (e.g. a switch) that is allocated to a first Virtual Design Context (VDC) element of a plurality of VDC elements instantiated on (i.e., active in) the network element so that the NAM module can monitor traffic flow on the first VDC element. In this aspect of the present disclosure, a method for the NAM module to monitor traffic flow from a second VDC element (i.e. a VDC element different from the first VDC element) is disclosed. The method includes providing, from the NAM module, to the network element, over a management communication link between the NAM module and the network element (i.e. over the bi-directional connection for exchanging control traffic), a first command triggering the network element to allocate the network element data port to the second VDC element (i.e. to trigger the network element to logically move data port interfaces so that the NAM can receive traffic flow from the second VDC element), and following allocation of the network element data port to the second VDC element, monitoring traffic on the second VDC element by receiving, at the NAM module, from the network element, over the data communication link between the NAM data port and the network element data port(i.e., over the unidirectional data link between the data port of the NAM module and the data port of the switch that is now allocated to the second VDC), the traffic flow from the second VDC element.

In an aspect, a method for a NAM module to monitor network traffic on multiple VDCs of one or more network elements (managed devices) is disclosed. The method includes seamlessly driving a move of data port interfaces from an original VDC to a target VDC, and enabling configuration of the data ports to receive SPAN data traffic. In an embodiment, the data ports may comprise data ports supporting SPAN destination traffic flow to the target VDC. In an embodiment, the step of seamlessly driving the move may include the NAM module providing one or more parameters, such as e.g. a data port, the target VDC, and SPAN resource port, to the one or more network elements. In an embodiment, the NAM module may be configured to communicate with the one or more network elements via one or more RISE channels. In an embodiment, the NAM module may further be configured to perform network appliance monitoring on the target VDC.

For all aspects of the present disclosure, a graphical user interface (GUI) may be provided that enable a user/administrator of a NAM module to control the various functionality described herein, such as remote execution of commands on a network element or reconfiguration of data port interfaces to monitor traffic in a target VDC. For example, such a GUI could be configured to enable a user/administrator to at least provide user input indicating the target VDC as well as, optionally, provide user input indicating a data port and SPAN resource port. A GUI could be displayed on a display of an electronic device, e.g. on a display of the NAM module or a controller associated with the NAM module.

As will be appreciated by one skilled in the art, aspects of the present disclosure, in particular the functionality of the NAM module described herein as well as the functionality of the network element (including any of the VDCs instantiated on that element) that the NAM module is configured to monitor, may be embodied as a system, a method or a computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor, e.g. a microprocessor, of a computer. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing service appliances as well as to the existing network elements such as the existing routers, switches, various control nodes, etc.) or be stored upon manufacturing of these devices and systems.

DETAILED DESCRIPTION OF EXAMPLE EMBODIMENTS

System Overview: Service Appliances and Network Switches

Figure 1B:
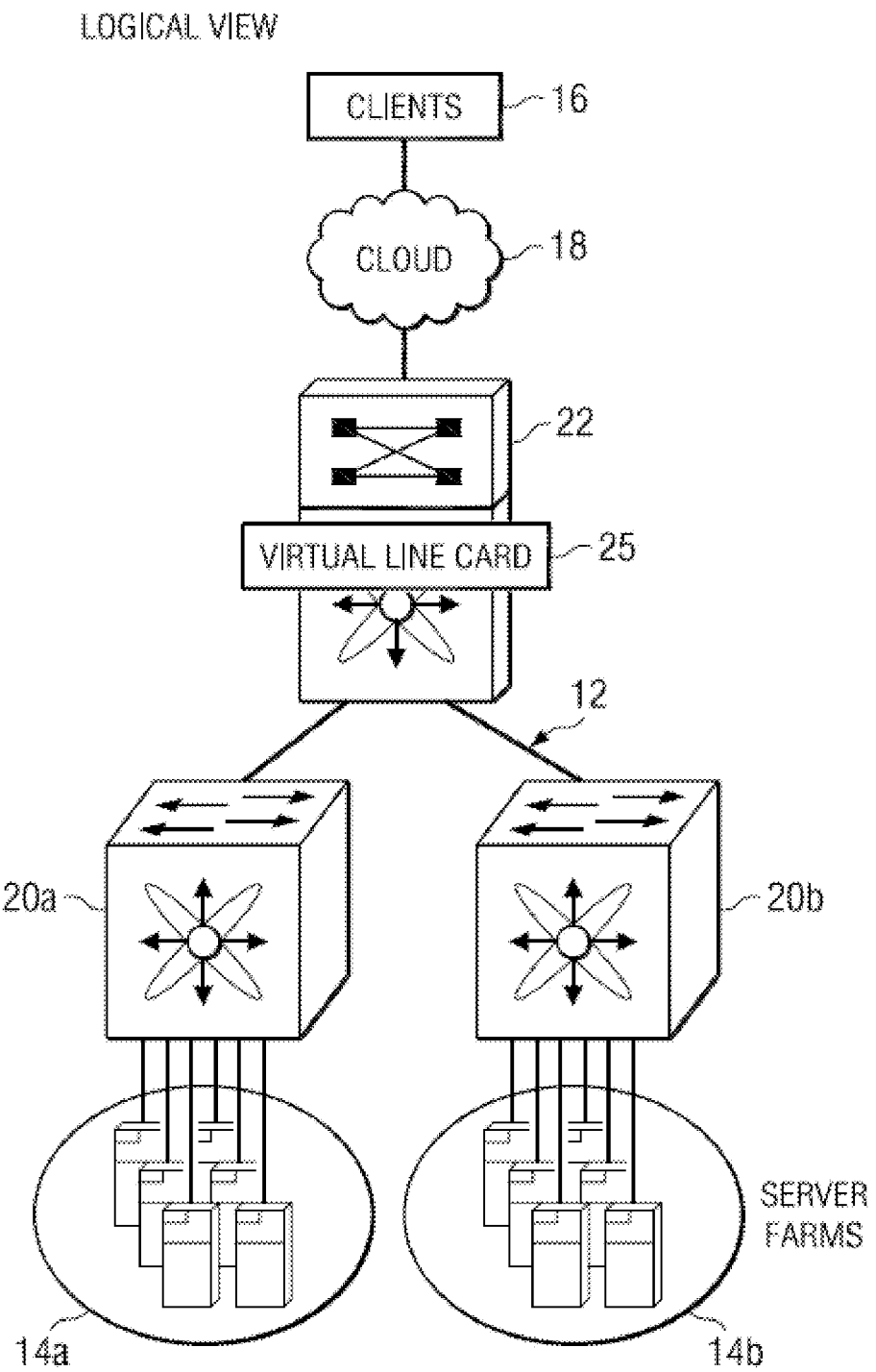
FIG. 1B is a simplified schematic diagram illustrating a logical view of the system in accordance with some embodiments of the present disclosure.
Figure 2:
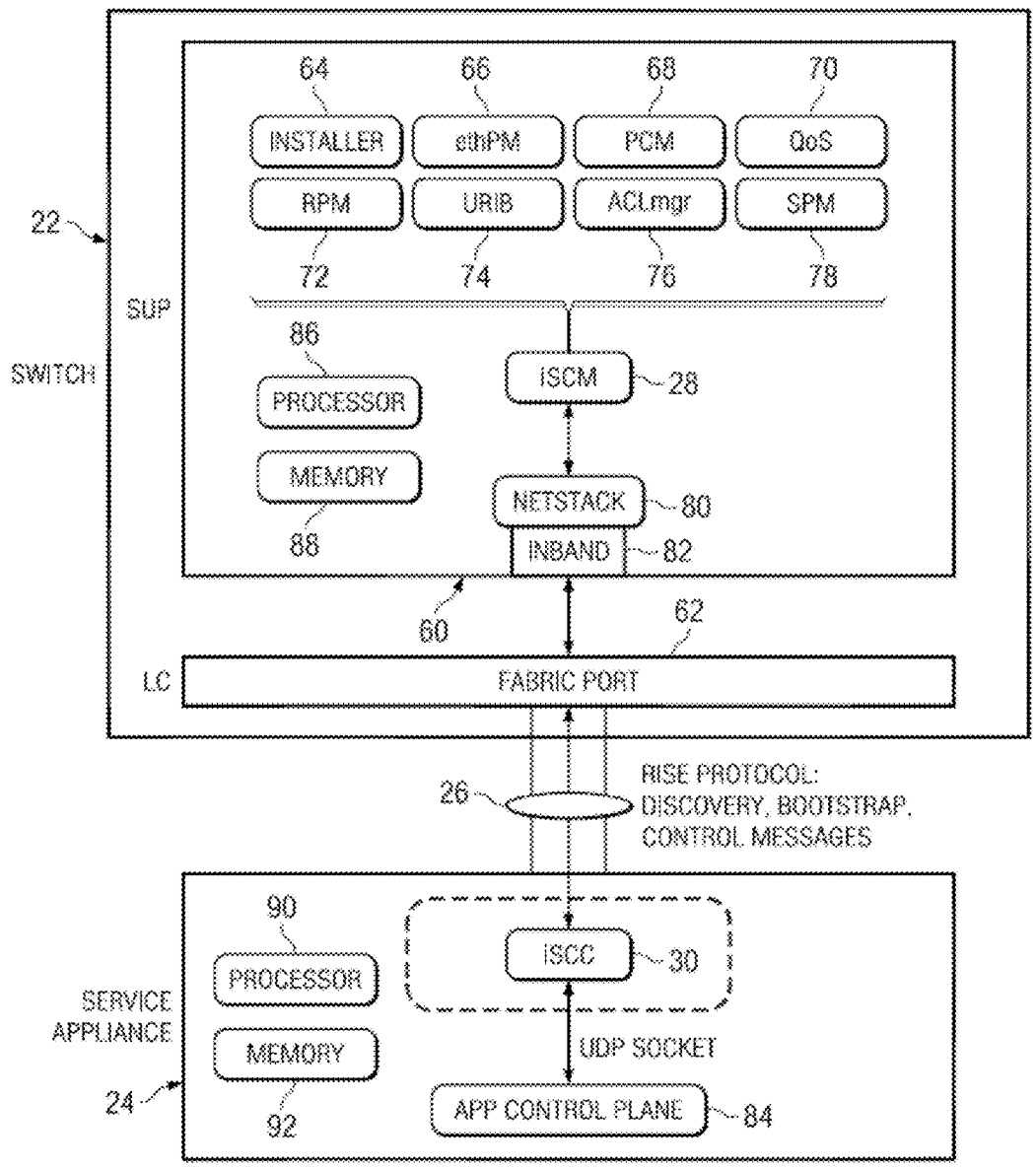
FIG. 2 is a simplified block diagram illustrating details of the system in accordance with some embodiments of the present disclosure.

FIGS. 1A-B and 2 show examples of a system architecture for providing service appliances in a network environment, and specifically, providing service appliances as virtual line cards in a network switch. The virtual line card allows the service appliances to be located anywhere in the network, but other ways of providing the service appliance (e.g., directly connecting the service appliance on the switch) are also possible. It is noted that the examples are merely illustrative and are not intended to be limiting. Other architectures and configurations are envisioned by the disclosure.

FIG. 1A is a simplified schematic diagram illustrating a physical view of a system 10 for providing service appliances in a network environment. FIG. 1 includes a network (illustrated as multiple links 12) that connects one or more server farms 14a and 14b to one or more clients 16 via a cloud 18. Cloud 18 may encompass any public, semi-public, and/or private networks including enterprise networks, an Internet or intranet, community networks, etc. Individual servers in server farm 14a and 14b may communicate within the same farm via switches 20a and 20b, respectively. Servers in server farm 14a may communicate with servers in server farm 14b via a switch 22 in this particular example implementation.

A service appliance 24 may connect to switch 22 over a communication channel 26 (e.g., over a port-channel). As used herein, a "communication channel" encompasses a physical transmission medium (e.g., a wire), or a logical connection (e.g., a radio channel, a network connection) used to convey information signals (e.g., data packets, control packets, etc.) from one or more senders (e.g., switch 22) to one or more receivers (e.g., service appliance 24). A communication channel, as used herein, can include one or more communication links, which may be physical (e.g., wire) or logical (e.g., data link, wireless link, etc.). Termination points of communication channels can include interfaces such as Ethernet ports, serial ports, etc. In embodiments of system 10, communication channel 26 may be a single channel: deployed for both control messages (i.e., messages that include control packets) and data messages (i.e., messages that include data packets).

As used herein, a "service appliance" is a discrete (and typically, but not necessarily, separate) hardware device with integrated software (e.g., firmware), designed to provide one or more network services including load balancing, firewall, intrusion prevention, virtual private network (VPN), proxy, etc. In some cases, switch 22 may be configured with an intelligent service card manager module (ISCM) 28, and service appliance 24 may be configured with a corresponding intelligent service card client module (ISCC) 30. ISCM 28 and ISCC 30 can form part of a Remote Integrated Service Engine (RISE) infrastructure for configuring service appliance 24 on the switch, e.g., as a virtual line card in switch 22.

FIG. 1B is a simplified schematic diagram illustrating a logical view of system 10. In some cases, ISCC 30 and ISCM 28 may be configured to allow service appliance 24 to appear as a virtual line card 25, or some other virtual network node/entity. The terms "line card" and "service module" are interchangeably used herein to refer to modular electronic circuits interfacing with telecommunication lines (such as copper wires or optical fibers) and that offer a pathway to the rest of a telecommunications network. Service appliance is often referred simply as "appliance" or "module" herein. Hence, virtual line card 25 is interchangeable (in certain instances) with ISCM 28. A virtual service module (or a virtual line card) is a logical instance (of a service module) providing the same functionalities (as the service module). Service modules may perform various functions including providing network services (e.g., similar to service appliances). One difference between a service module and a service appliance is that the service module may be physically located within a switch, for example, on an appropriate slot. Virtual service modules are similarly configurable within a switch.

Broadly speaking, RISE (or comparable technologies) allows (external) service appliances connect to a switch and behave like a service module within a switch without having to take up a physical slot in the switch. RISE helps consolidate how the appliances are provisioned, and enables the appliances to have the benefits of being a service module within the switch. The task for provisioning and configuring of these service appliances is performed mostly by RISE being provided on the switch, making it easy for network administrators to add/remove service appliances in the network.

According to embodiments of the present disclosure, an appliance user can enjoy the same benefit of a service module's simple configuration and operation using the infrastructure of system 10. For example, setting up service appliance 24 for network configurations may be unnecessary. Substantially all such configurations may be made via switch 22, instead of service appliance 24. Service appliance 4 may offload (i.e., transfer) any network (e.g., L2/L3 network) specific control plane and data plane operations to switch 22. Data path acceleration that leverages an application specific integrated circuit (ASIC) (potentially embedded in switch 22) may also be possible in various embodiments. Switch 22 may communicate control messages to service appliance 24 over communication channel 26. Thus, configuration and provisioning of services within service appliance 24 may be implemented via switch 22.

Note that the numerical and letter designations assigned to the elements of FIGS. 1A and 1B do not connote any type of hierarchy; the designations are arbitrary and have been used for purposes of teaching only. Such designations should not be construed in any way to limit their capabilities, functionalities, or applications in the potential environments that may benefit from the features of system 10. For ease of description, only two representative server farms are illustrated in FIGS. 1A and 1B. Any number of server farms and switches may be connected in the network without departing from the broad scope of the present disclosure.

For purposes of illustrating the techniques of system 10, it is important to understand the communications in a given system such as the system shown in FIGS. 1A and 1B. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typically, network services such as load balancing, firewall, intrusion prevention, proxy, virtual private network (VPN), etc. are provided through one or more of the following options: (1) service appliances that connect to network switches and routers; (2) specially designed high-performance routers configured with the services; or (3) network devices such as routers or switches that are configured with service modules that provide the services.

Typical service appliances (e.g., load balancers) integrate services such as load balancing, firewall, intrusion prevention, VPN, etc. in a single box format, which is generally based on modular, scalable platforms and which provides the most cost-effective option of the three options listed previously. Service appliances are typically connected externally to a switch (e.g., aggregate switch or access switch, etc.) via appropriate ports. Different service appliances are designed with specific features applicable to different network environments. The service appliances may be deployed independently to service-specific areas of the network infrastructure, or they may be combined for a layered approach. Service appliances are typically located between the clients and server farms. Data packets generally pass through the service appliances on the way to (and from) the servers/clients. The service appliances may be managed by a management application (e.g., software) on the service appliance that enables configuration settings and other management functions.

Network services may also be provided by specially designed high-performance routers. Such routers may implement a massive parallel processor hardware and software architecture to deliver integrated network services (e.g., firewall, deep packet inspection, etc.). Many of the functionalities are embedded in a specially designed processor in the router. For example, such a specially designed router can provide an integrated security solution (e.g., stateful packet filtering, intrusion detection and prevention, per-user authentication and authorization, VPN capability, extensive QoS mechanisms, multiprotocol routing, voice application support, and integrated WAN interface support) and routing in a single box.

Network services may also be integrated into a network device (such as a switch or router) using dedicated line cards. The line cards are typically installed inside the device, allowing any port on the device to operate as a firewall port, while integrating the services inside the network infrastructure. Several line cards may be installed in the same chassis, providing a modular solution where needed. Such solutions permit the user to take advantage of existing switching and routing infrastructure without any costly upgrades.

Turning to the potential infrastructure of FIGS. 1A and 1B, the example network environment may be configured as one or more networks and, further, may be configured in any form including, but not limited to, local area networks (LANs), wireless local area networks (WLANs), virtual local area networks (VLANs), metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Elements of FIGS. 1A and 1B may be coupled to one another through one or more interfaces employing any suitable connection (wired or wireless), which provides a viable pathway for electronic communications. Additionally, any one or more of these elements may be combined or removed from the architecture based on particular configuration needs. System 10 may include a configuration capable of transmission control protocol/Internet protocol (TCP/IP) communications for the electronic transmission or reception of packets in a network. System 10 may also operate in conjunction with a user datagram protocol/IP (UDP/IP) or any other suitable protocol, where appropriate and based on particular needs. In addition, gateways, routers, switches, and any other suitable network elements may be used to facilitate electronic communication between various nodes in the network.

Switches in system 10, including switches 22, 20a, and 20b, may include any type of network element connecting network segments. For example, switches 22, 20a, and 20b may include a multi-port network bridge that processes and routes data at a data link layer (Layer 2). In another example, switches 22, 20a, and 20b may process data at a network layer (Layer 3), or Layer 4 (with network address translation and load distribution), or Layer (load distribution based on application specific transactions), or at multiple layers (e.g., Layer 2 and Layer 3). In certain embodiments, functionalities of switches 22, 20a, and 20b may be integrated into other network devices such as gateways, routers, or servers. In various embodiments, switches 22, 20a, and 20b may be managed switches (e.g., managed using a command line interface (CLI), a web interface, etc.).

Communication channel 26 may include a port-channel, which can encompass an aggregation of multiple physical interfaces into one logical interface, for example, to provide higher aggregated bandwidth, load balancing and link redundancy. Communication channel 26 with multiple links can provide a high availability channel: if one link fails, traffic previously carried on this link can be switched to the remaining links. Communication channel 26 may contain up to 16 physical communication links and may span multiple modules for added high availability. In one embodiment, communication channel 26 can represent a port-channel with an aggregation of four point-to-point communication links over multiple ports. In another embodiment, communication channel 26 can represent a virtual port-channel (vPC).

Although FIGS. 1A and 1B show server farms 14a and 14b, it should be appreciated that system 10 is not limited to servers. In fact, any network element may be connected to the network via appropriate switches, where these implementations may be based on particular needs. As used herein, the term "network element" is meant to encompass computers, network appliances, servers, routers, switches, gateways, bridges, load balancers, firewalls, processors, modules, or any other suitable device, component, proprietary element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. For example, server farms 14a and 14b may be replaced with LANs connecting desktop computers in a small office. In another example, server farms 14a and 14b may be replaced with a network of wireless communication devices. In yet another example, server farms 14a and 14b may be replaced with one or more supercomputers. Various other configurations and devices are contemplated within the broad framework of the present disclosure.

According to embodiments of the present disclosure, system 10 may provide for a fabric extender (FEX)-like protocol, auto-discovery, message transport service (MTS)-like control messages, and defined messages between service appliance 24 and switch 22. Configuration of service appliance 24 may be performed on switch 22 as for a line card. Data path forwarding may be offloaded to network line cards in switch 22. Control path processing may be offloaded to a supervisor engine on switch 22 as appropriate. In embodiments where service appliance 24 has multiple virtual services (e.g., virtual machines), each virtual service may be a separate virtual line card on switch 22.

Turning to FIG. 2, FIG. 2 is a simplified block diagram illustrating example details of system 10 according to embodiments of the present disclosure. A supervisor engine 60 on switch 22 may communicate service appliance 24 via a line card including a fabric port 62 that connects point-to-point to a node on service appliance 24. Supervisor engine 60 may include several modules such as an installer 64, an Ethernet port manager (ethPM) 66, a port-channel manager (PCM) 68, a Quality of Service (QoS) element 70, a route policy manager (RPM) 72, a unified/unicast routing information base (URIB) 74, an access control list manager (ACLmgr) 76, and a service policy manager (SPM) 78 for performing various routing and/or management functions. ISCM 28 may be provisioned in supervisor engine 60 to provide RISE related functionalities. ISCM 28 may manage one or more service modules, including in-chassis service modules and remote service modules.

In various embodiments, service appliance 24 may support stream control transmission protocol (SCTP) with various addresses (e.g., 127 addresses). In the absence of native SCTP support in supervisor engine 60, tunneling over UDP may be enforced to send SCTP packets. A Netstack module 80 may be provisioned in supervisor engine 60 for implementing TCP/IP stack for received frames hitting the control-plane of supervisor engine 60. Supervisor engine 60 may be configured with an inband port 82, which may be a virtual port that provides an interface for management traffic (such as auto-discovery) to a management processor such as a processor 86.

According to various embodiments, ISCM 28 may offer various functionalities such as handling (i.e., accommodating, managing, processing, etc.) RISE messages (e.g., in MTS format), high availability activities, timer events, packet switch stream (PSS), American Standard Code for Information Interchange (ASCII) generation, logging, event handling, health monitoring, debugging, etc. ISCM 28 may be a finite state machine utility (FSMU) based application (e.g., which indicates an abstract machine that can be in one of a finite number of states). In various embodiments, ISCM 28 may have a well-defined MTS seamless authentication protocol (MTS SAP) assigned and it can open a socket-based MTS queue and bind to the well-defined SAP such that other processes may communicate with it.

In various embodiments, ISCM 28 may also maintain an array of MTS operation code ("opcode"), which can define how to process a received MTS message. The array may include per-opcode specific MTS flags, handler functions, etc. ISCM 28 may be configured to receive CLI driven MTS messages, MTS notifications (such as event driven messages indicating, for example, that a particular VLAN is up or down), and MTS request/responses. In various embodiments, ISCM 28 may be configured so that MTS-based communication with other processes may be non-blocking and asynchronous. Thus, ISCM 28 may handle multiple events (which can arrive at any time) for the same resource such that the state of the resource is consistent (and not compromised). A similar opcode can be provided even in non-MTS messages, which serves to indicate how to a switch or a service can process the message.

Subsequent to ports (e.g., appliance ports and switch ports) being configured in RISE mode, auto-discovery and bootstrap may be performed by ISCM 28 and SCC 30 to establish an appropriate control channel. After the control channel is established, applications in service appliance 24 may send control messages (e.g., using the UDP socket interface) to ISCC 30 through an application control plane 84. Application control plane 84 generally encompasses one or more software components for performing workflow management, self-management, and other application control layer processes. ISCC 30 may forward the control messages to ISCM 28 of switch 22 over communication channel 26. In example embodiments, ISCM 28 and ISCC 30 may communicate via UDP packets; however, various other protocols and formats may be accommodated by the teachings of the present disclosure. Supervisor 60 may be provisioned with (or have access to) processor 86 and a memory 88 for performing its various functions. ISCM 28 may use processor 86 and memory 88 to perform RISE related functions in switch 22. Similarly, service appliance 24 may be provisioned with (or have access to) a processor 90 and a memory 92. ISCC 30 may use processor 90 and memory 92 to perform RISE related functions in service appliance 24.

NAM

Network Appliance Monitoring or Network Appliance Module (NAM) refers to, interchangeably, a process of and a module for monitoring network elements such as e.g. switches 22, and other devices that have large amounts of data traffic flowing in, out, and within a data center. Such monitoring is conventionally performed e.g. by tapping the traffic or/and obtaining a copy of the traffic. One problem with such conventional monitoring is that packet contents typically contain limited amount of information and/or information that is unreadable due to e.g. encryption. In addition, there is no contextual information as to e.g. from which network element a packet may be originating or which network element a packet may be traversing. Contextual information is key to correlating events in the network to support making of intelligent decisions or fixing of network issues. Therefore, improved systems and methods for NAM are needed.

In the following, the term "NAM module" is used to describe an appliance, e.g. the service appliance 24 as described in FIGS. 1A-1B and 2, configured to perform Network Appliance Monitoring on a network element, e.g. the switch 22 as described in FIGS. 1A-1B and 2 (e.g. Cisco Nexus 7000, 6000, or 5000 series switches).

Network Appliance Monitoring by Remotely Executing Commands

Embodiments of the present disclosure provide a NAM mechanism for a NAM module to mine information from a network element by opening up a communication channel in a form of a remote execution channel between the NAM module and the network element and using the communication channel for executing commands on the network element. In various embodiments, the NAM module may be attached to the switch or/and residing on the switch (i.e., an on-board appliance).

Figure 3:
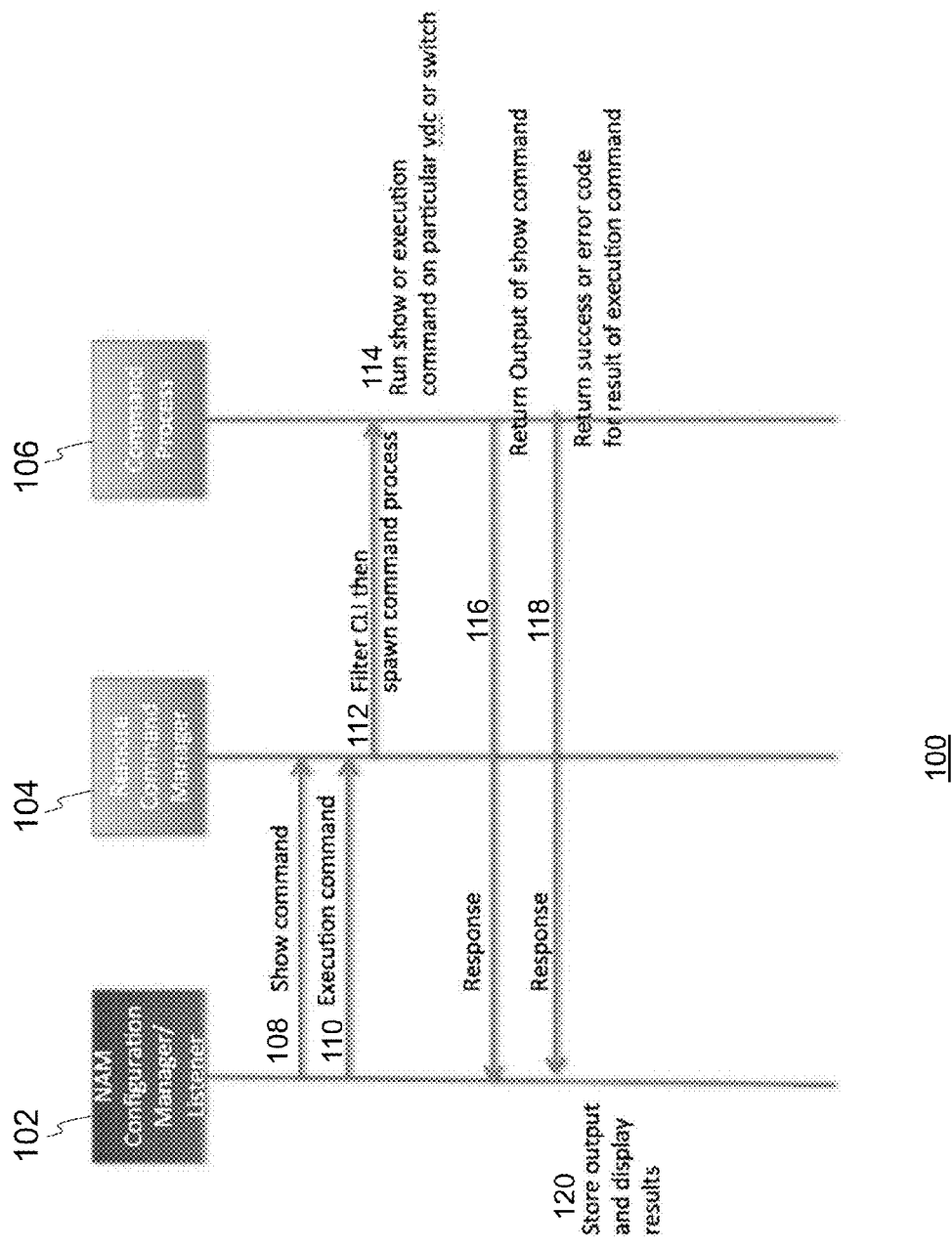
FIG. 3 illustrates a Network Appliance Monitoring mechanism for mining information by remotely executing commands in accordance with some embodiments of the present disclosure.

FIG. 3 illustrates a NAM mechanism 100 for mining information by remotely executing commands, according to an embodiment of the present disclosure. As shown in FIG. 3, the mechanism 100 involves a NAM configuration manager (also referred to as a "listener") 102, a Remote Command Manager 104, and a Command Process 106. The NAM configuration manager 102 is a functional element in a NAM module such as the service appliance 24 (which could be a part of the ISCC 30 configured to use processor 90 and memory 92 to perform RISE related functions in service appliance 24), while the Remote Command Manager 104 and the Command Process 106 are functional elements in a network element such as the switch 22 (which could be parts of the ISCM 28 configured to use processor 86 and memory 88 to perform RISE related functions in switch 22).

First, the NAM configuration manager 102 is configured to provide a command to the switch 22 (e.g. RISE_CMD_EXEC message), in particular to the Remote Command Manager 104 of the switch 22, over a communication channel 26, e.g. the RISE channel described above. Examples of providing such a command are shown in FIG. 3 as steps 108 and 110, where the NAM configuration manager 102 provides to the Remote Control Manager 104 a show command and an execution command, respectively.

The command received at the Remote Command Manager 104 triggers the switch 22 to determine whether execution of the received command, on the switch 22, is allowed. To that end, in an embodiment, the Remote Control Manager 104 may be configured to filter Command Line Interface (CLI) to determine whether the received command is one of the commands that are allowed to be executed on the switch 22 and, possibly, to determine whether the particular service appliance 24 that provided the command is allowed to request execution of such a command.

In an embodiment, the NAM module may be configured to first send a message to the monitored network element requesting the dictionary of commands that are allowed to be executed by this NAM module on the switch. For example, the NAM module may send such a message once it is booted, or as a part of a booting process. The network element would then respond with a set commands that are acceptable (i.e. would be allowed for execution). The NAM module would receive this response, store the list of commands, only provide commands that are on the list, thus minimizing rejections of requests for execution.

In an embodiment, an opcode for the message requesting the dictionary of commands could be RISE_OPC_CMD_DICT. When the switch receives the RISE_CMD_EXEC message from the NAM module, it checks the commands in the message against the dictionary it has. If a command is not present on the dictionary, the switch will skip applying the command and send an error message to the NAM module.

In an embodiment, the switch may be configured to send a message to the NAM module identifying new CLI added to the dictionary.

Once the Remote Control Manager 104 determined that the received command may be executed, it may spawn (initiate) command process, as shown with step 112.

As shown with step 114, the Command Process 106 then runs (i.e., executes) a show or an execution command on the network element, possibly on a particular VDC element of the network element. The result of the command execution can be sent back to the originator/appliance, in this case to the NAM configuration manager 102, e.g. to a listening TCP/UDP port that is running a listener thread. This is shown in FIG. 3 with steps 116 and 118, where the command process 106 returns, to the NAM configuration manager 102, at least a part of the output of the show command (step 116) and returns success or error code for the result of the execution command (step 118). The information returned can be in an Extensible Markup Language (XML) format, Simple Network Management Protocol (SNMP), plain text, or any other format that a switch supports, e.g. as requested by the NAM module. The NAM configuration manager 102 may then store the output provided by the command process 106 and, optionally, display the results to a user, e.g. via a graphical user interface (GUI) provided on the NAM module. Such a GUI may also be used e.g. for enabling an administrator of the NAM module to specify output format for information returned from the network element.

In an embodiment, the mechanism described herein may gather/access information based on Role-Based Authentication information, i.e. the Remote Command Manager 104 may be configured to determine whether execution of a command provided by the NAM configuration manager 102 on the network element is allowed based on role-based authentication of the particular service appliance 24 that provided the command.

In an embodiment, the Remote Configuration Manager 104 may provide a message to the NAM module, authenticating the module, e.g. auth_key[RISE_AUTH_STR_LEN] field can be filled to send a predetermined string that authorizes a particular NAM module.

In an embodiment, the mechanism described herein may provide Authenticated access/control based on a set of dictionary-based keys, such as e.g. verbs.

In an embodiment, the mechanism described herein may facilitate or retry of configuration at chassis, e.g. configuring SPAN sessions and/or disabling or enabling SPAN sessions. Some examples of such configuration are described in greater detail in a following section.

Embodiments of the present disclosure provide a reliable mechanism for a NAM module to remotely execute commands on a network element. The mechanism uses a control protocol, e.g. RISE protocol described herein, between the switch and the NAM module. A variety of formats and data can be used by the NAM module in order to retrieve data from the network element being monitored. In this manner, massive capital expenditures (CAPEX) and operational expenditures (OPEX) may be achieved by easily integrating a NAM module with a network element such as a switch or a router. The mechanism allows faster and better performance as compared to other techniques such as e.g. SNMP. Different types of format may be supported, based on the requirements of a monitoring device. By providing a dictionary of commands, access may be restricted based on the type of monitoring device or application.

NAM Module Enabling Dynamic VDC Aware SPAN

Often, users of a NAM module may wish to monitor traffic in more than one VDC elements on a switch 22. However a NAM module typically only has one physical data link connected to one VDC. In order to SPAN traffic to a different VDC, the data link needs to be moved to that VDC. This manual process of moving ports can be tedious and error-prone.

Embodiments of the present disclosure enable monitoring network traffic on multiple VDCs of a switch using a single NAM module. To that end, if a monitored network element supports contexts (i.e. VDC elements), a NAM module could be configured to seamlessly drive the move of the data port interfaces (at the managed device) from one context to the other (step 1 described in greater detail below). After the move of the data ports that support SPAN destination traffic flow to the target VDC is complete, these SPAN destination ports may be configured to be able to receive SPAN data traffic (step 2 described in greater detail below). The configuration of the SPAN destination ports may be automatic in that it may be driven by a NAM module itself without the intervention of a switch administrator (e.g. Nexus administrator), which qualifies the process to be called "Dynamic VDC aware SPAN."

Figure 4:
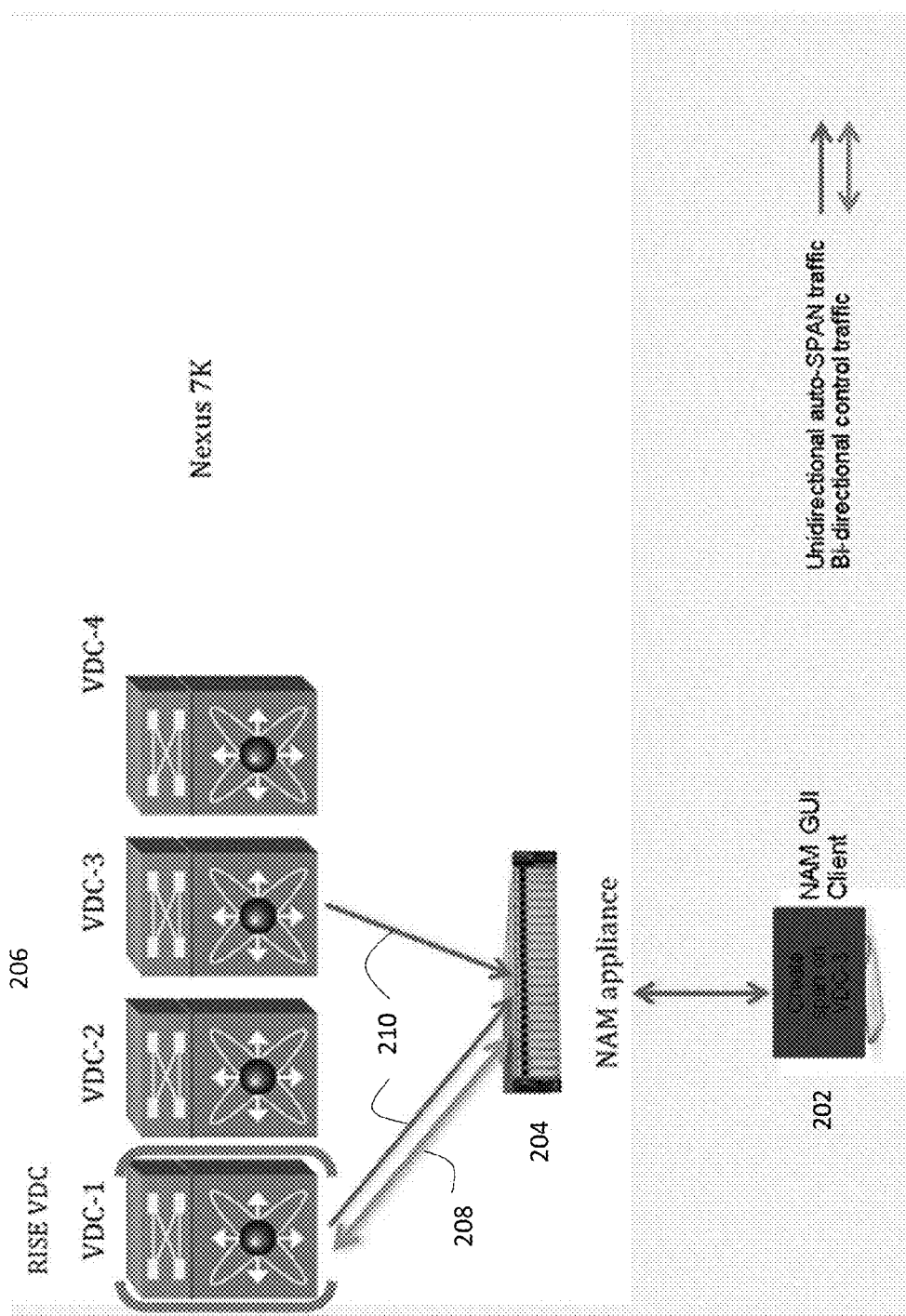
FIG. 4 illustrates a single NAM module configured to monitor traffic on multiple VDCs in accordance with some embodiments of the present disclosure.

Such a scenario is illustrated in FIG. 4, depicting a system 200 where a single NAM module 204 (shown as NAM appliance) is configured monitor a number of VDC elements 206 on a Nexus 7000 switch. As shown in FIG. 4, the NAM module 204 may comprise or be communicatively connected to a NAM Graphical User Interface (GUI) client 202. Such a GUI client may be configured to receive user input e.g. regarding user's desire to monitor traffic on another VDC. In this manner, a user on the NAM module's side is able to monitor traffic on an interface in any VDC. In FIG. 4, an arrow 208 illustrates bi-directional control traffic (e.g. a management link in the form of a RISE channel as described above), while arrows 210 illustrate unidirectional auto-SPAN traffic.

While FIG. 4 depicts and the following illustrative description describes a scenario with four VDCs and the network element as being a Nexus 7000 (N7k) switch, teachings provided herein are applicable to any other number of VDCs and any other kind of a network element with multiple VDCs, which are all within the scope of the present disclosure.

First, a data port of the NAM module 204 is connected to a data port of the monitored network element such as e.g. a switch 22 (in FIG. 4 —the N7K switch) and that data port of the switch is allocated to a first VDC (VDC-1). In step 1, in order to seamlessly drive the move of the data port interfaces, e.g. for configuring dynamic VDC aware SPAN, the NAM module 204 is configured to provide to the switch a command triggering the switch to allocate the data port of the switch that is connected to the data port of the NAM module to another VDC, e.g. VDC-2. To that end, the NAM module 204 may be configured to provide a command comprising three parameters: an indication of the NAM data port connected to the data port of the monitored switch, an identification of VDC-2 to be monitored (i.e., the target VDC where the SPAN has to be set up), and an identification of a data port of the second VDC element to be monitored (i.e., the SPAN source port of the target VDC). In an embodiment, these parameters may be provided via the GUI 202.

Such a command provided from the NAM module to the switch could be referred to as an Auto SPAN message, received on the RISE channel. In an embodiment, the following message may be used for this step: RISE_CMD_EXEC, with possible sub opcodes including SHOW and EXECUTE, as described above. Further discussions provided above regarding remote execution of commands on a switch provided above in context with the NAM configuration manager 102 and the Remote Control Manager 104 are applicable here, and, therefore, in the interests of brevity, are not repeated here.

In step 2, upon receiving the RISE_CMD_EXEC command from the NAM module, the switch will accordingly configure SPAN ports to be able to receive SPAN data traffic (i.e. set up the SPAN session by executing the commands sent in the RISE_CMD_EXEC request). To that end, the switch will configure the data port of the second VDC element to be monitored as a SPAN source port of VDC-2 and will move the destination SPAN port to target VDC by allocating the data port of the switch to which the data port of the NAM module is physically connected to VDC-2 (in particular, by configuring that data port of the switch as a SPAN destination port of VDC-2).

In an embodiment, the switch executing the move of the data port interfaces may be viewed as the switch carrying out three steps: 1) allocate interface to the target VDC, 2) set the 'switchport' and 'monitor' mode on the physical interface, and 3) initiate the SPAN configuration for monitor session to set source and destination.

An example of the switch instating the SPAN configuration for a monitored session to set up source and destination is provided below:

```
typedef struct rise_cmd_exec_req_ {
    uint32_t message_id;
    uint32_t message_code;
    uint32_t vdc_id;
    char auth_key[RISE_AUTH_STR_LEN];
    uint16_t port;
    uint16_t cmd_type;
    uint16_t cmd_len;
    uint8_t cmd[0];
} rise_cmd_exec_req_t;
```

Additional messages may be exchanged between the switch and the NAM module for initiation and completion of auto span service.

For example, the switch may provide to the NAM module a message identifying the VDC elements instantiated on the switch. An example of such a message is VDC_INFO message as follows:

```
typedef struct rise_nam_vdc_info_t_ {
uint16_t vdc_id;
char vdc_label[MAX_VDC_NAME_LEN];
} rise_nam_vdc_info_t;
```

The above message notifies the NAM module of the VDC ID and name of active VDCs available in the managed device.

Another example is a DATA_PORT_INFO message provided from the switch to the NAM module in order to notify the NAM module about which NAM data port is connected to which managed device interface. This information may then displayed on the NAM GUI interface, allowing a user of the NAM module to create SPAN sessions as desired. An example of a DATA_PORT_INFO message is provided below:

```
typedef struct rise_data_port_info_ {
uint16_t port_no;
char phy_intf[RISE_MAX_INTF_NAME_LEN];
} rise_data_port_info_t;
```

Once the data port interfaces have been reconfigured, the NAM module may also execute commands on the second VDC (VDC-2), by providing respective commands on the management link and receiving data on the data link, as described above.

Dynamic VDC Aware SPAN—Multiple Chassis

In an embodiment, dynamic VDC aware SPAN may be extended to multiple chassis (i.e. to multiple monitored network elements, e.g. multiple switches). As the NAM module typically has a single management port, that port is used to directly attach to one monitored network element, e.g. a first switch such as the switch 22 (in FIG. 5—the N7K-1 switch, in FIG. 6—a switch 218). A second network element (e.g. another switch, in FIG. 5—the N7K-2 switch, in FIG. 6—a switch 220) is connected to the first. In an embodiment of multiple chassis without a virtual port-channel ("vPC"), i.e. a physical group of interfaces behaving as one logical interface, shown in FIG. 5, the connection may be via an L3 link. Alternatively, the connection may be via a vPC, as shown in FIG. 6. Thus, in a multiple chassis embodiment, a management port of a NAM module may be attached to a monitored network element either directly or indirectly whereas the data ports are directly attached. For the case when the management port is directly attached (e.g. between the NAM appliance and the N7K-1 switch or switch 218), there could be a physical cable that connects the two ports. For the case when the management port is indirectly attached (e.g. between the NAM appliance and the N7K-2 switch or switch 220), the connectivity could be achieved over an L2 network (vPC peer link or some other L3 link).

Figure 5:
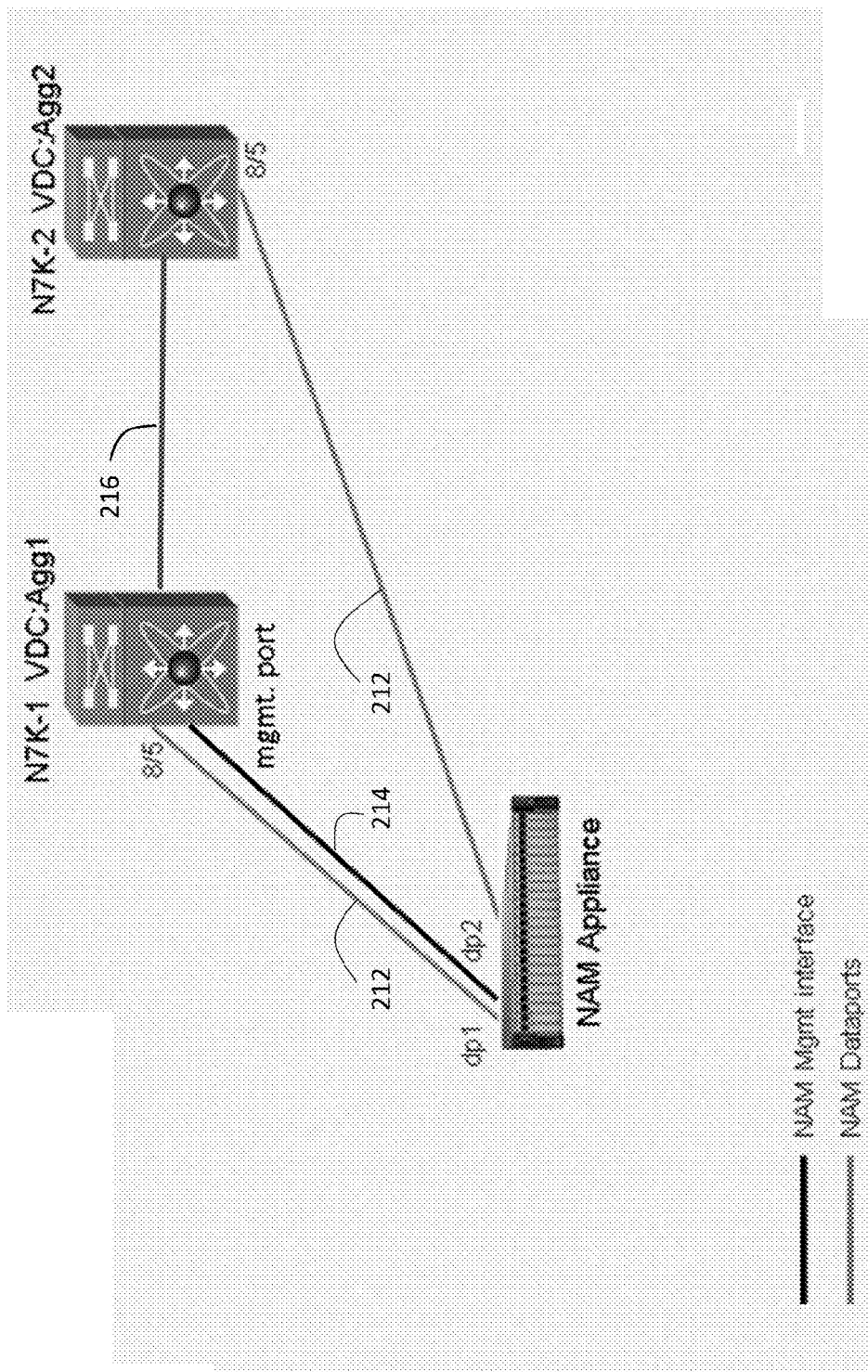
FIG. 5 illustrates VDC aware SPAN extended to multiple chassis in accordance with some embodiments of the present disclosure.
Figure 6:
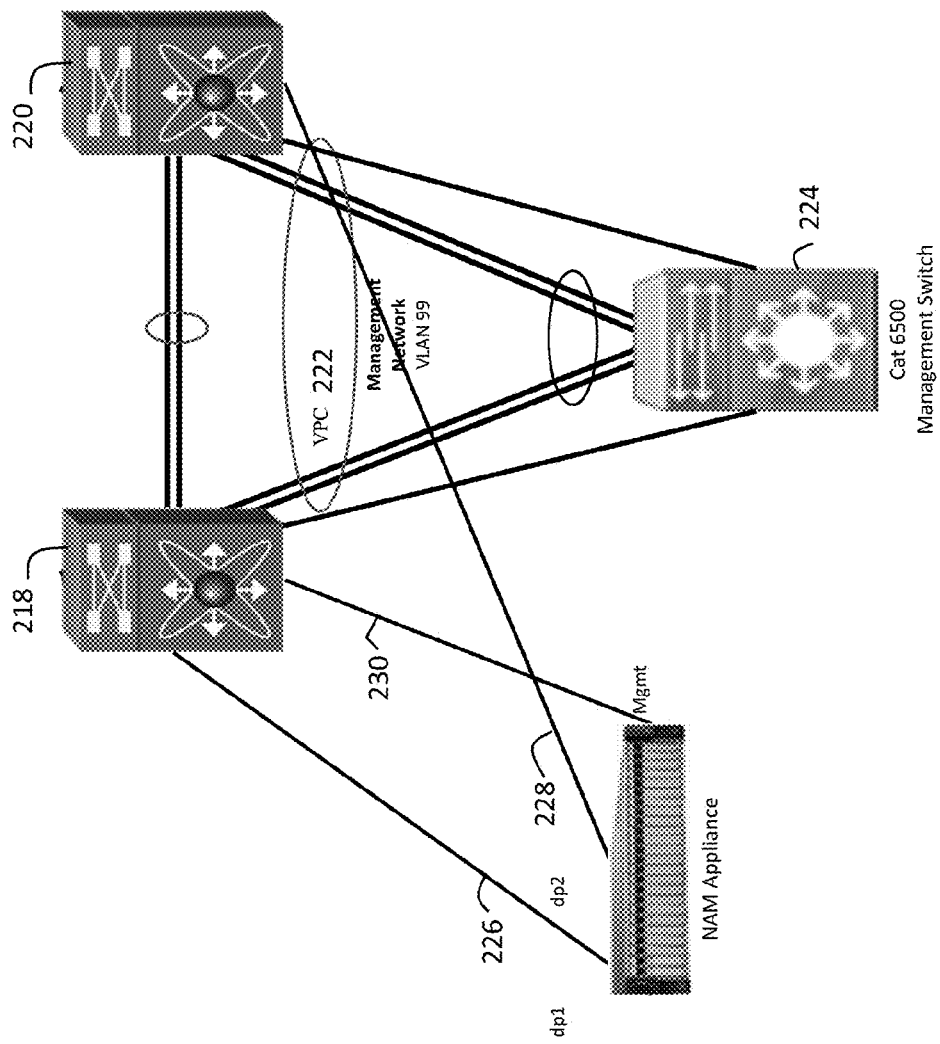
FIG. 6 illustrates a NAM module communicatively connected to two N7k for VPC in accordance with some embodiments of the present disclosure.

FIG. 5 illustrates a NAM module (shown as "NAM appliance"), such as e.g. the NAM module 204, communicatively connected to a first chassis N7K-1 and a second chassis N7K-2. Lines 212 illustrate NAM data ports, while a line 214 illustrates a NAM management interface. In addition, line 216 illustrates a communication management link, e.g. an L3 link, between the first and the second chassis. This link is used to indirectly attach the second chassis to the NAM module. In other words, this connection behaves as the management link from the NAM module to the second switch. In this manner, a single management port on a NAM module may be used to support RISE services in multiple managed devices/switches. The data port links on NAM module may be distributed between the two or more switches based on the user's need.

Support for the indirect mode RISE service is needed for the topology in which one NAM module is connected to multiple chassis. In such a topology, one connection will be direct and the others will be indirect mode. Through the direct mode, a switch may provide the IP to the NAM module and it gets auto configured. For the remaining indirect mode connections, a switch may be configured to find the NAM module and make TCP connections, without the need for L2 discovery and IP address allocation (L3 discovery may still be needed to create the RISE service).

FIG. 6 illustrates a NAM module communicatively connected to two network elements 218 and 220 (e.g. N7K switches) for vPC 222, according to an embodiment of the present disclosure. In an embodiment, traffic coming from a switch 224 (Catalyst switch) may be hashed to one of the two (or more) switches in the vPC 222, thus providing redundancy and high availability because if one of the switches malfunctions, the other switch can still handle the traffic. In FIG. 6, lines 226 and 228 illustrate NAM data ports, while a line 230 illustrates a NAM management interface.

Embodiments related to the Network Appliance Monitoring by remotely executing commands and related to the NAM module enabling VDC aware SPAN are applicable to the multiple chassis topologies illustrated in FIGS. 5 and 6, possibly with modifications that would be apparent to a person skilled in the art based on the description provided herein. In the interests of brevity, those descriptions are not repeated here.

Embodiments of the present disclosure provide a single NAM module with visibility to all VDCs in a managed device. A user may utilize a NAM GUI to create SPAN sessions to monitor traffic in a VDC and the embodiments described herein allow to automatically move the ports to the required VDC and apply the SPAN configuration. In this manner, a single NAM module is able to monitor traffic in any VDC without changing the physical wiring.

Further, embodiments of the present disclosure provide a reliable mechanism for configuring multiple SPAN sessions, e.g. for up to four NAM data ports, using a NAM GUI. Embodiments of the present disclosure further allow using the NAM GUI for creating, editing, and deleting SPAN sessions and selecting destination ports and source ports for the SPAN sessions. The options of SPAN configuration available to N7K Command Line Interface (CLI) users may be made available via NAM GUI using RISE.

Variations and Implementations

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, provisioned in service appliance 24 and/or switch 22 (e.g., through various modules, algorithms, processes, etc.). In some embodiments, one or more of these features may be implemented in hardware, provided external to these elements, or consolidated in any appropriate manner to achieve the intended functionality. Service appliance 24 and/or switch 22 may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, switch 22 and service appliance 24 described and shown herein (and/or their associated structures) may also include suitable interfaces for receiving, transmitting, and/or otherwise communicating data or information in a network environment. Additionally, some of the processors and memories associated with the various network elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memories (e.g., memory 92, memory 88) can store data used for the operations described herein. This includes the memory being able to store instructions (e.g., as part of logic, software, code, etc.) that are executed to carry out the activities described in this Specification. A processor can execute any type of instructions associated with the data to achieve the operations detailed herein in this Specification. In one example, processors 86 and processor 90 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in system 10 can include one or more memory elements (e.g., memory 88, memory 92) for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, formatting, and protocols, system 10 may be applicable to other exchanges, formats, or routing protocols. Moreover, although system 10 has been illustrated with reference to particular elements and operations that facilitate the communication process, these elements, and operations may be replaced by any suitable architecture or process that achieves the intended functionality of system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims (if any) or examples. In order to assist the United States Patent and Trademark Office (USPTO) and, additionally, any readers of any patent issued on this application in interpreting the claims (if any) or examples appended hereto, Applicant wishes to note that the Applicant: (a) does not intend any of the appended claims or examples (if any) to invoke paragraph six (6) of 35 U.S.C. section 112 as it exists on the date of the filing hereof unless the words "means for" or "step for" are specifically used in the particular claims (if any) or examples; and (b) does not intend, by any statement in the specification, to limit this disclosure in any way that is not otherwise reflected in the appended claims (if any) or examples.

Although the claims are presented in single dependency format in the style used before the USPTO, it should be understood that any claim can depend on and be combined with any preceding claim of the same type unless that is clearly technically infeasible.

What is claimed is:

1. A method for a network appliance monitoring (NAM) module to execute a command on a network element, the method comprising:
as a part of a booting process of the NAM module, providing a first message from the NAM module to the network element, the first message requesting a list of commands which are allowed to be executed by the NAM module on the network element;
receiving, at the NAM module, from the network element, the list of commands requested in the first message;
providing the command, from the list of commands received from the network element, from the NAM module to the network element over a first communication channel between the NAM and the network element, the command triggering the network element to determine whether execution of the command is allowed and, upon positive determination, execute the command on the network element; and
receiving, at the NAM module, from the network element, at least part of an output resulting from the execution of the command.

2. The method according to claim 1, wherein the command comprises a show command or an execute command.

3. The method according to claim 1, wherein the at least part of the output is received in an Extensible Markup Language (XML) format, Simple Network Management Protocol (SNMP), and/or a plain text format.

4. The method according to claim 1, further comprising providing, from the NAM module to the network element, an indication of a format for providing the at least part of the output from the network element to the NAM module.

5. The method according to claim 1, further comprising the NAM module performing network appliance monitoring based on the received at least part of the output.

6. A system for a network appliance monitoring (NAM) module to execute a command on a network element, the system comprising:
at least one memory configured to store computer executable instructions, and
at least one processor coupled to the at least one memory and configured, when executing the instructions, to:
establish a first communication channel between the NAM module and the network element, wherein the first communication channel is a communication channel of a Remote Integrated Service Engine (RISE) protocol;
provide the command from the NAM module to the network element over the first communication channel between the NAM and the network element, the command triggering the network element to determine whether execution of the command is allowed and, upon positive determination, execute the command on the network element; and
receive, at the NAM module, from the network element, over the first communication channel, at least part of an output resulting from the execution of the command.

7. The system according to claim 6, wherein the command comprises a show command or an execute command.

8. The system according to claim 6, wherein the determination of whether the execution of the command is allowed comprises filtering Command Line Interface (CLI).

9. The system according to claim 6, wherein the at least part of the output is received in an Extensible Markup Language (XML) format, Simple Network Management Protocol (SNMP), and/or a plain text format.

10. The system according to claim 6, wherein the at least one processor is further configured to provide, from the NAM module to the network element, an indication of a format for providing the at least part of the output from the network element to the NAM module.

11. The system according to claim 6, wherein the at least one processor is further configured to perform network appliance monitoring based on the received at least part of the output.

12. The system according to claim 6, wherein the at least one processor is further configured to configure at least a part of the network element based on the received at least part of the output.

13. The system according to claim 12, wherein configuring at least a part of the network element comprises configuring one or more SPAN sessions on the network element.

14. The system according to claim 6, wherein the at least one processor is further configured to provide, from the NAM module to the network element, authentication information identifying the NAM module.

15. The system according to claim 6, wherein the network element includes an intelligent service card manager module ("ISCM") that forms part of a Remote Integrated Service Engine ("RISE") element with a corresponding intelligent service card client module ("ISCC") installed on the NAM module.

16. One or more non-transitory computer readable storage media encoded with software comprising computer executable instructions for a network appliance monitoring (NAM) module to execute a command on a network element and, when the software is executed, operable to:
establish a first communication channel between the NAM module and the network element, wherein the first communication channel is a communication channel of a Remote Integrated Service Engine (RISE) protocol;
provide a first message from the NAM module to the network element, the first message requesting a list of commands which are allowed to be executed by the NAM module on the network element;
receive, at the NAM module, from the network element, the list of commands requested in the first message;
provide the command, from the list of commands received from the network element, from the NAM module to the network element over the first communication channel between the NAM and the network element, the command triggering the network element to determine whether execution of the command is allowed and, upon positive determination, execute the command on the network element; and
receive, at the NAM module, from the network element, at least part of an output resulting from the execution of the command.

17. The one or more non-transitory computer readable storage media according to claim 16, wherein the command comprises a show command or an execute command.

18. The one or more non-transitory computer readable storage media according to claim 16, wherein the at least part of the output is received in an Extensible Markup Language (XML) format, Simple Network Management Protocol (SNMP), and/or a plain text format.

19. The one or more non-transitory computer readable storage media according to claim 16, further operable to perform network appliance monitoring based on the received at least part of the output.

20. The one or more non-transitory computer readable storage media according to claim 16, wherein the network element includes an intelligent service card manager module ("ISCM") that forms part of a Remote Integrated Service Engine ("RISE") element with a corresponding intelligent service card client module ("ISCC") installed on the NAM module.

\* \* \* \* \*